(Model.)

G. D. DUDLEY & S. MANSFIELD.
Wire Hinge.

No. 235,859. Patented Dec. 28, 1880.

Witnesses
Wm. S. Brown
N. P. Ockington

Inventor
Stanley Mansfield
George D. Dudley
By David Hall Rice their Atty

UNITED STATES PATENT OFFICE.

GEORGE D. DUDLEY AND STANLEY MANSFIELD, OF LOWELL, MASSACHUSETTS, ASSIGNORS TO WOODS, SHERWOOD & CO., OF SAME PLACE.

WIRE HINGE.

SPECIFICATION forming part of Letters Patent No. 235,859, dated December 28, 1880.

Application filed August 5, 1880. (Model.)

*To all whom it may concern:*

Be it known that we, GEORGE D. DUDLEY and STANLEY MANSFIELD, of Lowell, in the county of Middlesex and State of Massachusetts, have invented a new and useful Improvement in Hinges for Doors and Other Articles, of which the following is a specification.

Our invention consists in forming the leaves of hinges of wire, and in so forming and combining the same as to produce a cheap, strong, and ornamental article, as hereinafter described.

Figure 1:
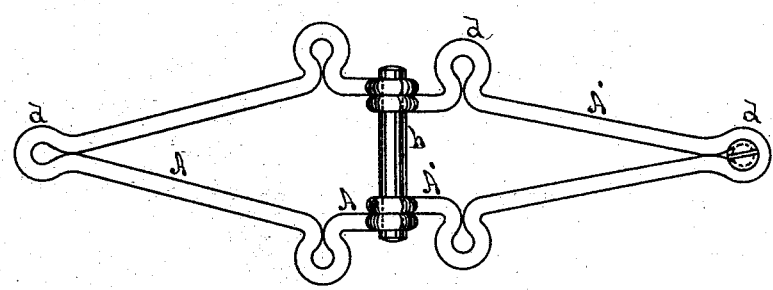
Figure 2:
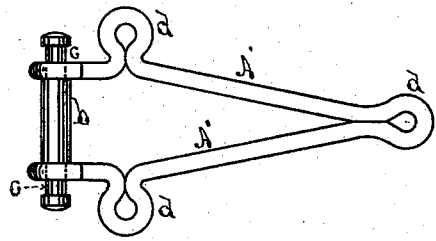

In the drawings, Figure 1 represents our improved hinge in plan view. Fig. 2 represents one of the leaves and the axial stud or pivot, showing how it is bent around and combined with the same.

A is a piece of wire bent so as to form a leaf of the hinge. Its two ends are bent around an axial stud or pivot, $b$, in grooves or recesses $c\ c$, cut circumferentially in the metal of the pivot, near its ends. The opposite leaf, A', is formed in like manner of another piece of wire having its ends bent in like manner around the pivot $b$ in the grooves $c\ c$. The wires A A' are bent in proper shape to form the eyes for screws $d\ d$, which receive the screws which secure the hinge in position for operation. The grooves $c\ c$ are cut in the stud $b$, just long enough to receive and hold the ends of the wires A A', and when the latter are bent around the pivot the joints so formed are free to turn or revolve upon the stud $b$.

When the entire hinge is completed it is dipped in melted tin or other suitable metal, which not only coats the surface of the wire, but solders its contiguous parts together at the eyes $d\ d$, and adds greatly to their strength and durability.

We do not confine ourselves to this precise method of forming the hinge of wire, as several other methods may be adopted, although we prefer the form described. For instance, the pivot $b$ may be formed in one piece with the wire A or A' of one of the leaves of the hinge, and the other of said wires may be bent around such last-described stud, so as to allow it to turn thereon. The eyes may also be bent in any other desired form, and the leaves of the hinge may be made of any other shape desired, so as to suit the use to which the hinge is to be put or the taste of the user. Any convenient number of eyes may also be bent or formed in each leaf of the hinge, according to the degree of strength and security desired.

What we claim as of our invention, and desire to secure by Letters Patent, is—

1. A hinge having one or more of its leaves formed of wire, with eyes for the pintle formed by bending the wire, and other eyes for fastening-screws, formed by bending the wire in loops perpendicular to the pintle-eyes, substantially as described.

2. A hinge having its opposite leaf or leaves formed of wire and joined to a common axis, $b$, by bending around the latter, so as to revolve thereon, substantially as described.

3. The axis $b$, having therein the grooves $c\ c$, to receive the wires A A', bent therein, and hold the same in position, substantially as described.

GEORGE D. DUDLEY.
STANLEY MANSFIELD.

Witnesses:
WARREN B. COTTON,
FRED H. WHITNEY.